C. F. PFALZGRAF.
HANDLE FOR DISH PANS.
APPLICATION FILED JAN. 7, 1909.
933,487.
Patented Sept. 7, 1909.
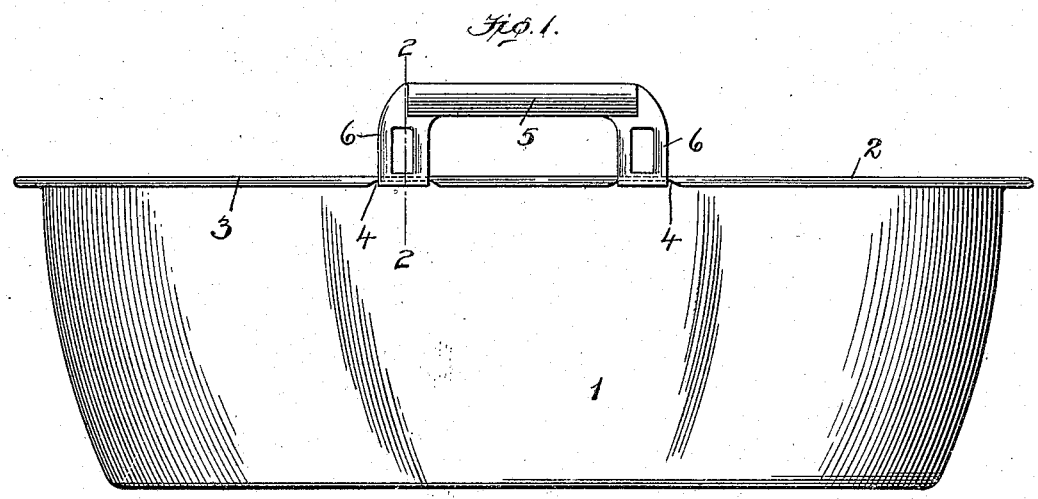
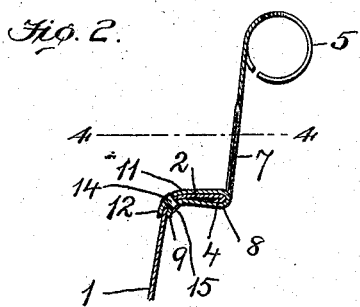
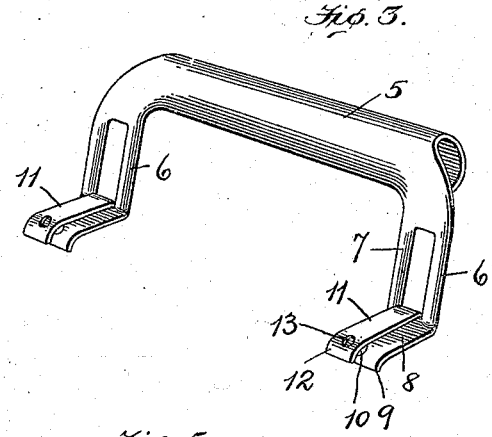
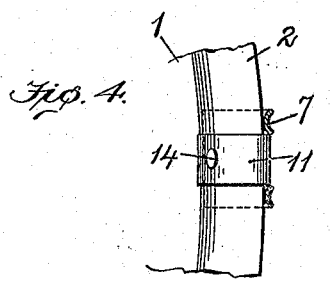
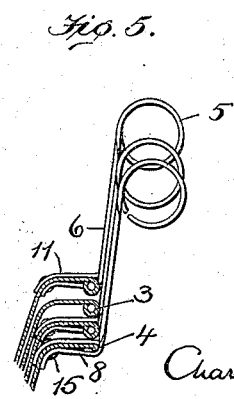
Witnesses
Edwin L. Bradford
G. Ferd. Vogt
Inventor
Charles F. Pfalzgraf
By Mann & Co,
Attorneys

UNITED STATES PATENT OFFICE.

CHARLES F. PFALZGRAF, OF BALTIMORE, MARYLAND.

HANDLE FOR DISH-PANS.

933,487.  Specification of Letters Patent.  Patented Sept. 7, 1909.

Application filed January 7, 1909. Serial No. 471,072.

*To all whom it may concern:*

Be it known that I, CHARLES F. PFALZGRAF, a citizen of the United States, residing at Baltimore, in the State of Maryland, have invented certain new and useful Improvements in Handles for Dish-Pans, of which the following is a specification.

This invention relates to improvements in handles for sheet metal vessels and has particular reference to handles that are to be attached to or adjacent the lateral rim-flanges of vessels such for example as dish pans.

One object of the invention is to provide a handle of such improved construction that the same may be formed from a single piece of sheet metal and which may extend beneath the rim-flange of the vessel so as to lie close against the same thereby permitting the pans to be nested closely.

Another object is to provide a handle that may be clipped over the rim of the vessel in such a way that its clipping-members and the wall of the vessel may be engaged by a rivet to secure them together.

With these and other objects in view the invention is illustrated in the accompanying drawing, in which, Figure 1 is a side elevation of a pan to which my improved handle is attached. Fig. 2 is a vertical section through one end of the handle and a portion of the vessel wall,—the section being taken on the line 2—2 of Fig. 1. Fig. 3, is a perspective view of the handle detached. Fig. 4, is a sectional plan view through the handle showing the clipping members and the flange of the vessel,—the section being taken on the line 4—4 of Fig. 2, and Fig. 5 is a vertical sectional view through portions of several vessels showing the same nested,—the handles of the vessels being arranged in different vertical planes to permit the vessels to fit close together.

Referring to the drawing the numeral, 1, designates the vessel proper, and, 2, the horizontal or laterally-projecting flange at the upper edge thereof. This flange is provided with a coil, 3, at its outer edge for the purpose of reinforcing the same, except at the point where the handle is to be attached, at which point the edge is merely folded back as at, 4, produced by merely mashing the coil at that point.

The handle is formed from a single piece of sheet metal and comprises a tubular grip portion, 5, and downwardly-projecting ends, 6, at opposite ends of the grip portion. These ends are provided with corrugations, 7, which extend up and down and which serve to strengthen the handle. By reference to Fig. 3, it will be seen that the ends of the handle have inwardly-projecting flange portions, 8, which are provided with downwardly-curved edges, 9, and perforations, 10, therein and adjacent said edges. It will be seen that the flanges, 8, are substantially horizontal; that the ends, 6, incline upwardly from said flanges and that the tubular grip portion, 5, curls outwardly away from the inclined plane of the ends. A finger or clip plate, 11, also projects laterally from the ends and has position substantially parallel with the flange, 8. This clip plate is provided with a curved edge, 12, and a perforation, 13, adjacent said curved edge. In order to form the clip plate I punch the metal from the inclined end portions of the handle at a point between the corrugations, 7, and turn that metal forwardly over the flange portion, 8.

The lateral flange, 2, of the vessel at the point where the flanges, 8, and clip-plates, 11, engage, as explained, has a flattened portion, 4, so that the flanges, 8, may seat up close against the bottom side of the flange, 2. When in position, the flanges, 8, of the handle will project beneath the flange, 2, of the vessel while the clip-plates, 11, will project over said flange, 2, thus clamping said vessel flange between them. When in this clamped position a rivet, 14, may be passed through the perforation, 13, of the clip-plate, then through a similar perforation in the vessel flange, 2, and finally through the perforation, 10, in the flange, 8, and when riveted as at 15 on the under side will rigidly secure the handle and vessel together. It will be seen by reference to Fig. 2, that the flange, 8, lies close against the under side of the vessel flange and that the rivet, 14, is so placed that its head, 15, will lie in the bend of the handle flange, 8.

In packing or nesting the pans the handles will not be placed one directly over another but to one side of each other so that the tubular grip portions, 5, will not contact with each other.

It has been found in practice that strong handles constructed as herein shown and described can be produced by placing two thin metal sheets together and then stamping out and forming the handles from the two plies and thereby forming a strong handle from this metal that would otherwise be unsuitable.

Having thus described my invention what I claim and desire to secure by Letters Patent is,—

1. The combination with a vessel having a lateral flange with a curled edge,—said edge being flattened at a plurality of points, of a handle also having a lateral flange that extends parallel and in contact with flattened portions of the vessel flange and a rivet extending through the two flanges.

2. The combination with a vessel having a lateral flange at its rim edge, of a handle having a grip portion and downwardly-extending ends and each handle end provided with laterally-projecting spaced-apart clamping members which straddle the rim-flange of the vessel and a rivet passing through the spaced-apart clamping members and also through the rim flange of the vessel to secure the same together.

3. The combination with a vessel having a lateral flange, of a handle having downwardly-extending ends and each having a lateral flange at its lower extremity to project beneath the vessel flange and said ends also having a clamping plate punched therefrom which extends over the vessel flange, and a rivet for securing the clamping plate vessel flange and the end flange together.

4. The combination with a vessel having a tapering wall with a laterally-projecting rim-flange, of a handle having a horizontal grip portion above the vessel flange and with spaced-apart portions which extend downwardly from the grip portion and each spaced-apart downwardly-extending portion having a lateral flange with a downwardly-curved end which extends beneath and lies close against the bottom side of the vessel-flange with its curved end against the tapering wall of the vessel, and a rivet extending through the vessel wall and also through the curved end of the handle flange.

In testimony whereof I affix my signature in presence of two witnesses.

CHARLES F. PFALZGRAF.

Witnesses:
G. FERDINAND VOGT,
CHAS. B. MANN.